United States Patent

Kazmarek

[15] 3,665,278

[45] May 23, 1972

[54] COMPACT SERVO ACTUATOR

[72] Inventor: Edward Kazmarek, Reseda, Calif.

[73] Assignee: Lear Siegler, Inc., Santa Monica, Calif.

[22] Filed: Feb. 12, 1970

[21] Appl. No.: 10,756

[52] U.S. Cl. ............................. 318/466, 192/142, 318/615
[51] Int. Cl. ........................................................... G05b 5/01
[58] Field of Search .................. 192/142; 318/615, 616, 617, 318/618, 689, 467, 466

[56] References Cited

UNITED STATES PATENTS

| | | | |
|---|---|---|---|
| 3,183,420 | 5/1965 | Westenskow | 318/617 |
| 3,209,223 | 9/1965 | Scheib, Jr. | 318/615 |
| 2,465,601 | 3/1949 | Ochtman | 192/142 X |
| 2,906,983 | 9/1959 | Jenney | 318/467 X |

Primary Examiner—Benjamin Dobeck
Attorney—Jackson & Jones

[57] ABSTRACT

An engageable clutch is connected to the output shaft of a motor. The clutch is coupled to a servo actuator output shaft by a gear train that increases the motor torque. A slip clutch is disposed between the gear train and the servo actuator output shaft. A displacement transducer is coupled to the servo actuator output shaft and a velocity generator is coupled to the motor output shaft. The motor actuating signal, the output of the displacement transducer, and the output of the velocity generator are applied to the inputs of a summing junction that drives the motor. A housing encloses all of the components of the servo actuator to form a compact package capable of delivering large torque. The gear train is arranged in multiple columns that transmit torque to the output shaft in a back and forth path.

13 Claims, 2 Drawing Figures

COMPACT SERVO ACTUATOR

BACKGROUND OF THE INVENTION

This invention relates to the automatic control of mechanisms such as aircraft control surfaces and, more particularly, to a compact servo actuator capable of delivering high torque to such a mechanism.

In an automatic control system, a servo actuator is employed to position a mechanism responsive to an electrical actuating signal. Conventionally, the output shaft of a motor is coupled by a torque increasing gear train to an engageable clutch that is coupled by mechanical linkages to the mechanism to be moved. To disconnect the mechanism from the motor, the clutch is disengaged. A displacement transducer produces an electrical feedback signal representative of the displacement of the mechanism, and a velocity generator produces an electrical feedback signal representative of the velocity, i.e., the rate of change of displacement, of the motor output shaft. The motor drive signal is derived by differentially combining the feedback signals with the actuating signal.

One of the major users of servo actuators is the aircraft industry. Servo actuators are required in aircraft flight control systems, as well as support systems on board an aircraft. In a number of servo actuator applications, particularly those on board an aircraft, the size and weight of the servo actuator are of prime importance. For any particular servo actuator design, the size and weight are dictated by the output power requirements. The more output power that must be produced, the bulkier is the servo actuator.

SUMMARY OF THE INVENTION

The invention contemplates a servo actuator design that permits more output torque to be produced in a compact package than has been attainable in the past. In particular, a torque increasing gear train and an engageable clutch are connected between the torque producing motor and the output shaft. This arrangement of components permits the use of an engageable clutch having lower maximum torque capacity because less torque is transmitted through the clutch than is available at the servo actuator output shaft. Further, the clutch may be selected for optimum size and torque capacity depending on its placement in the gear train. In typical prior art designs, the engageable clutch is located at the servo actuator output shaft, so a larger maximum torque capacity is required to prevent slippage. The smaller torque capacity permitted by the invention results in a substantial reduction in the size and weight of the servo actuator.

A feature of the invention is the provision of a slip clutch between the gear train and the output shaft of the servo actuator to limit the output torque to a prescribed maximum value.

According to another feature of the invention, the gear train is arranged so the individual gears lie in two columns extending generally from the engageable clutch to the slip clutch. The resulting path of the gear train is back and forth from the engageable clutch to the slip clutch. This permits the gear train to increase the torque produced by the motor substantially, without consuming a great deal of space.

Another feature of the invention is the enclosure of the motor, the engageable clutch, the gear train, the slip clutch, a displacement transducer, and a velocity generator, all within the same housing to provide in one compact package a complete, self-sufficient, system for controlling the position of a mechanism. The servo actuator output shaft extends from the interior of the housing to its exterior.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
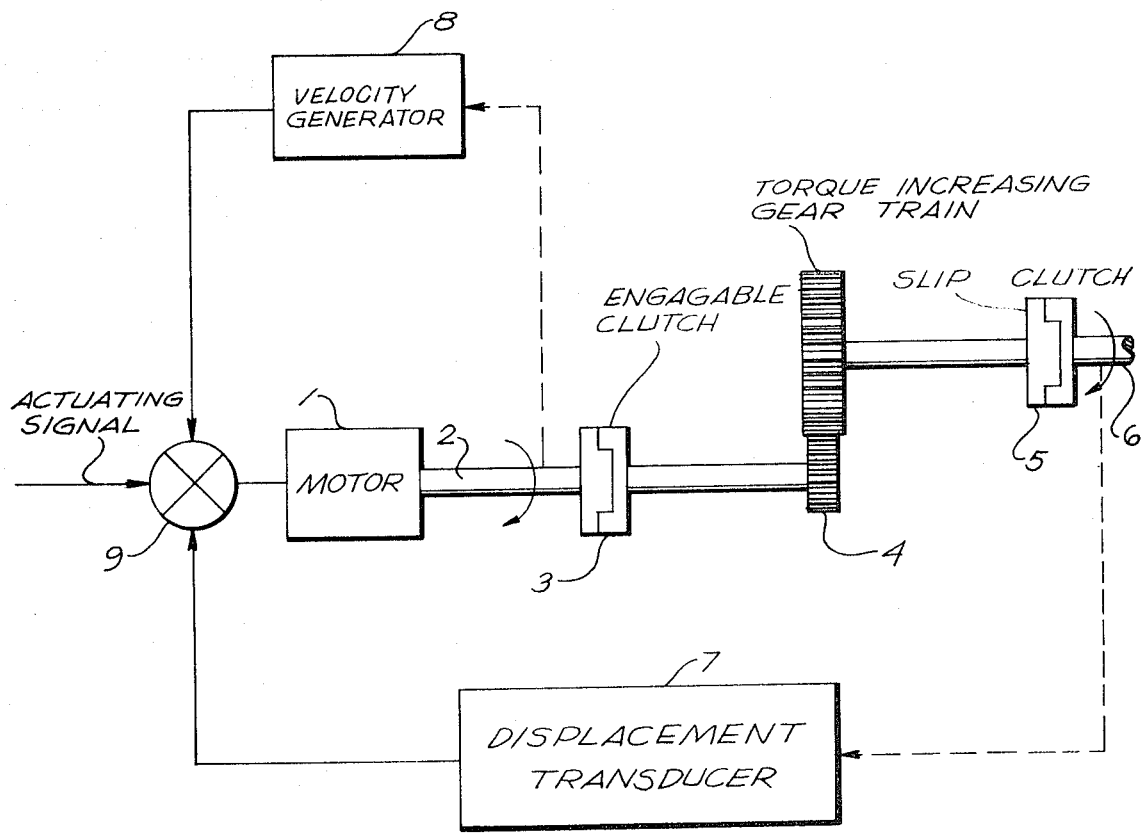
FIG. 1 is a schematic diagram partially in block form of a servo actuator incorporating the principles of the invention.

In FIG. 1, a motor 1 is shown having a rotatable output shaft 2. Shaft 2 is connected to one face of an engageable clutch 3. The other face of engageable clutch 3 is coupled through a torque increasing gear train 4 to one face of a slip clutch 5. The other face of slip clutch 5 is connected to an output shaft 6 of the servo actuator. Engageable clutch 3 could be a magnetically actuated clutch or any other type of clutch that is engaged and disengaged under the control of an external signal. Slip clutch 5 has permanently engaged faces that slip relative to one another when a predetermined torque is exceeded. A displacement transducer 7, which is coupled to servo actuator output shaft 6, produces an electrical feedback signal representative of the displacement of output shaft 6. A velocity generator 8, which is coupled to motor output shaft 2, produces an electrical feedback signal representative of the velocity, i.e., rate of change of displacement of shaft 2. The feedback signals produced by displacement transducer 7 and velocity generator 8 are differentially combined with an actuating signal at a summing junction 9. The output of summing junction 9 is applied to motor 1 as its drive signal.

When clutch 3 is engaged, the torque produced by motor 1 at motor output shaft 2 is increased by gear train 4 and applied through slip clutch 5 to servo actuator output shaft 6. The feedback signals produced by displacement transducer 7 and velocity generator 8 function in a conventional fashion to control the operation of motor 1, so the displacement of servo actuator output shaft 6 is representative of the actuating signal applied to summing junction 9. Depending on the circumstances, one or the other of the two feedback signal producers could be eliminated. For example, if the velocity of servo actuator output shaft 6 were to be representative of the actuating signal, displacement transducer 7 would be eliminated. To disconnect motor output shaft 2 from servo actuator output shaft 6, clutch 3 is disengaged. Slip clutch 5 serves to limit the torque available at servo actuator output shaft 6 to a predetermined maximum value.

By virtue of the fact that engageable clutch 3 precedes gear train 4 in the torque transmission path between shafts 2 and 6, it is possible for clutch 3 to be extremely compact. The torque at motor output shaft 2 is substantially smaller than the torque at servo actuator output shaft 6. Thus, the torque capacity of clutch 3 can be made much smaller without incurring unwanted slippage when clutch 3 is engaged. If clutch 3 were located at servo actuator output shaft 6, its torque capacity would have to be substantially larger in order to prevent slippage due to the larger applied torque.

Figure 2:
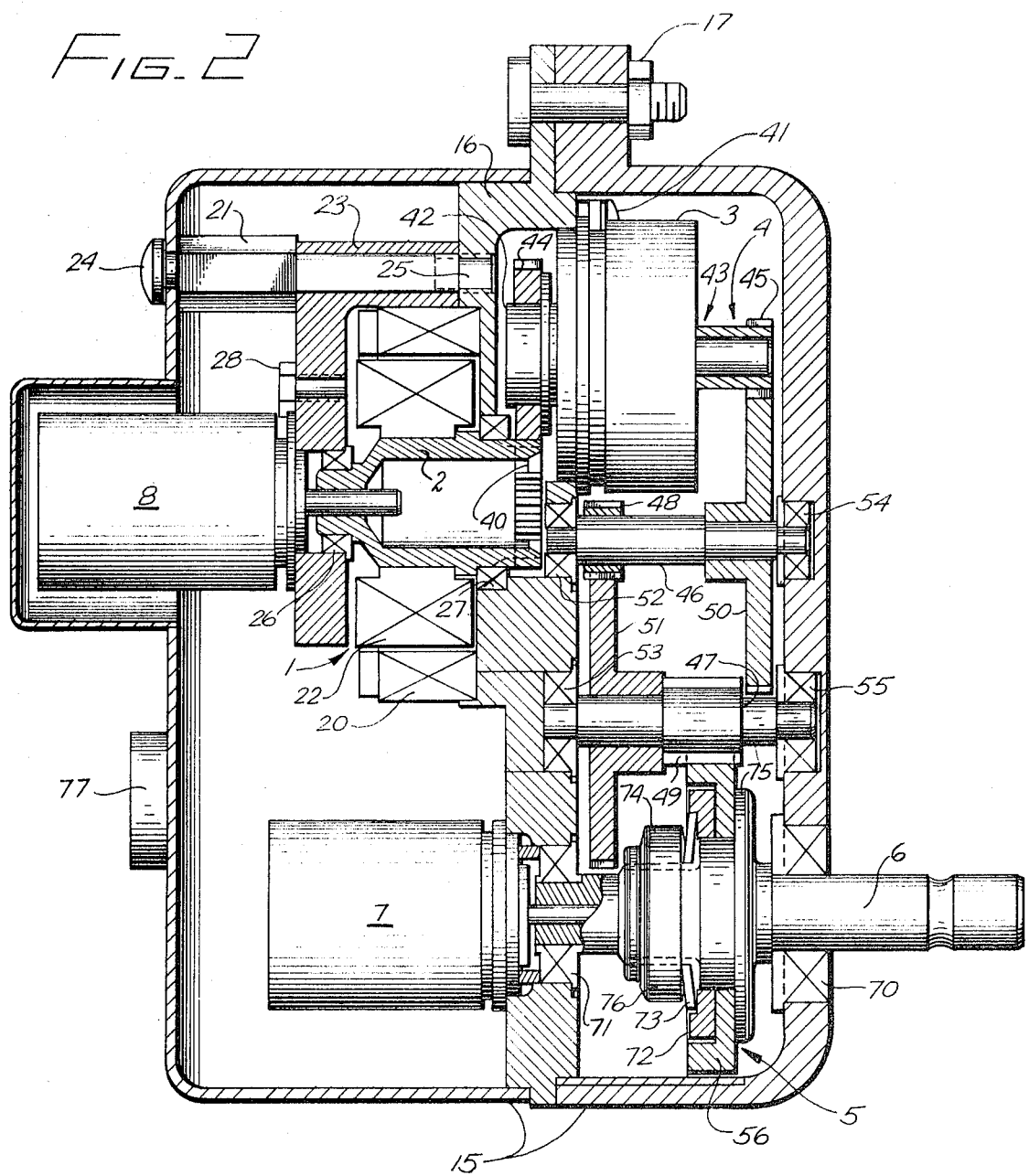
FIG. 2 is a side elevation view of the structural makeup of the servo actuator of FIG. 1 partially in section.

Reference is made to FIG. 2 for the structural makeup of the servo actuator shown schematically in FIG. 1. The components of the servo actuator are enclosed in a housing 15 having two halves divided by a component mounting plate 16. Plate 16 is attached to one-half of housing 15 by a plurality of nut and bolt assemblies such as that represented at 17. Motor 1 has a stator 20 that is secured to plate 16 and a rotor 22. Rotor 22 is secured to motor output shaft 2, which takes the form of a hub. A bracket 23 is attached to plate 16 by a plurality of screws such as that designated 24. As depicted at 25, the screws each have a threaded connection to bracket 23 and plate 16. The heads of the screws are disposed outside of housing 15, and spacers such as that designated 21 are disposed around the screws between housing 15 and bracket 23. Thus, screws 24 also serve to secure the other half of housing 15 to plate 16.

At one end, motor shaft 2 is rotatably supported relative to bracket 23 by journal bearings 26, and at the other end relative to plate 16 by journal bearings 27. The shaft of velocity generator 8 extends through a hole in the hub comprising motor output shaft 2 to form a tight, non-slipping fit therewith. Preferably, the shaft of velocity generator 8 and shaft 2 are additionally connected by a pin to ensure that no relative motion takes place between them. Velocity generator 8 is fixed to bracket 23 by screw fasteners such as that depicted at 28.

A spur gear 40 is fixedly mounted on the end of output shaft 2 opposite the velocity generator 8. Engageable clutch 3 is fixed to plate 16 by fasteners such as that designated 41. Clutch 3 has a rotatable input shaft 42 and a rotatable output shaft 43 that are rotatably supported by bearings (not shown) within clutch 3. A spur gear 44, which meshes with gear 40, is fixedly mounted on shaft 42. A small spur gear 45 is fixedly mounted on shaft 43. Gear train 4 comprises gear supporting shafts 46 and 47, small spur gears 48 and 49, and large spur gears 50 and 51. Shafts 46 and 47 are rotatably supported in parallel relationship to shafts 43 and 6 relative to plate 16 by journal bearings 52 and 53, respectively, and relative to housing 15 by journal bearings 54 and 55, respectively. Gears 48 and 50 are fixedly mounted on opposite ends of shaft 46, and gears 51 and 49 are fixedly mounted on opposite ends of shaft 47. Gears 50 and 51 are at the ends of their respective shafts nearest clutch 3 in the gear train path; and gears 48 and 49 are at the ends of their respective shafts nearest clutch 5 in the gear train path. Gears 45 and 50 mesh; gears 48 and 51 mesh; and gear 49 meshes with a gear 56 in slip clutch 5. As depicted in FIG. 2, the torque transmission path of gear train 4 moves back and forth as it extends between clutches 3 and 5, gears 45, and 50 being arranged in one column, gears 48 and 51 being arranged in another column and the gear 49 being aligned with the gear 56 between these columns. This gear configuration results in extremely efficient utilization of space within housing 15.

Output shaft 6 is rotatably supported with respect to housing 15 by journal bearings 70, and with respect to plate 16 by journal bearings 71. As shown, output shaft 6 extends from the interior of housing 15 to its exterior. In addition to gear 56, which is mounted on output shaft 6 so it is able to rotate with respect thereto, slip clutch 5 comprises a washer 72, an annular spring 73, a retaining nut 74, and a disc 75. Disc 75 is an integral part of output shaft 6 and, therefore, moves therewith at all times. Spring 73 and washer 72 are fixedly mounted on output shaft 6. Nut 74, which has a threaded connection with a portion 76 of output shaft 6 is tightened down against spring 73 to deform it. Therefore, spring 73 forces washer 72 against gear 56. Due to the friction between the adjacent surfaces of gear 56, washer 72, and disc 75 created by spring 73, the torques transmitted to gear 56 by gear train 4 normally are transmitted to output shaft 6 without slippage. When a predetermined limit torque is exceeded, washer 72 and disc 75 begin to slip relative to gear 56, thereby limiting the value of the output torque appearing at output shaft 6. The predetermined limit torque is adjusted by screwing or unscrewing nut 74.

Displacement transducer 7 is secured to plate 16 and has a shaft that extends through a hole in output shaft 6 to form a tight non-slipping fit therewith. Preferably, a pin connects shaft 6 with the shaft of displacement transducer 7 to ensure that no slippage occurs. An electrical connector 77 provides access to the interior of housing 15 for the actuating signal and electrical power for motor 1, displacement transducer 7, and velocity generator 8.

What is claimed is:

1. A servo actuator comprising:
 a servo actuator output shaft;
 a motor having an output shaft positioned responsive to an electrical actuating signal;
 an engageable clutch having an input coupled to the output shaft of the motor and an output shaft parallel to the servo actuator output shaft;
 a torque increasing gear train coupling the clutch output shaft to the servo actuator output shaft, the gear train comprising a plurality of gear supporting shafts rotatably mounted in parallel relationship to the servo actuator output shaft, a large gear at the end of each supporting shaft nearest in the path of the gear train to the clutch output shaft, a small gear mounted at the end of each supporting shaft nearest in the path of the gear train to the servo actuator output shaft, a small gear mounted on the clutch output shaft, and a large gear mounted on the servo actuator output shaft, each large gear engaging the adjacent small gear to form two gear columns that transmit torque from the clutch to the servo actuator output shaft in a back and forth path;
 means for generating an electrical feedback signal representative of the movement of the output shaft of the servo actuator; and
 means for modifying the actuating signal responsive to the feedback signal so the movement of the output shaft is representative of the actuating signal.

2. The servo actuator of claim 1, in which the means for generating a feedback signal is a displacement transducer coupled to the output shaft of the servo actuator to produce an electrical output signal representative of its displacement and the means for modifying the actuating signal is a summing junction having inputs to which the actuating signal and the output signal from the displacement transducer are differentially applied.

3. The servo actuator of claim 2, in which the means for generating a feedback signal further comprises a velocity generator coupled to the output shaft of the motor, the output signal from the velocity generator being applied to the summing junction differentially with respect to the actuating signal.

4. The servo actuator of claim 1, in which the means for generating a feedback signal comprises a velocity generator coupled to the output shaft of the motor to produce an electrical output signal representative of its velocity and the means for modifying the actuating signal comprises a summing junction having inputs to which the actuating signal and the output signal from the velocity generator are differentially applied.

5. The servo actuator of claim 1, additionally comprising a slip clutch coupled between the large gear mounted on the servo actuator output shaft and the servo actuator output shaft.

6. The apparatus of claim 1, additionally comprising a housing that encloses the motor, the clutch, the gear train, and the means for generating the feedback signal, the servo actuator output shaft extending from the interior of the housing to its exterior.

7. A servo actuator comprising:
 a motor having an output shaft positioned responsive to an electrical actuating signal;
 an engageable clutch;
 a rotatable shaft serving as the output of the servo actuator;
 a torque increasing gear train;
 means for coupling the gear train and the clutch between the output shaft of the motor and the output shaft of the servo actuator;
 means for generating an electrical feedback signal representative of the movement of the output shaft of the servo actuator;
 means for modifying the actuating signal responsive to the feedback signal so the movement of the output shaft is representative of the actuating signal;
 a housing having two halves enclosing the motor, the clutch, the gear train, and the generating means, the output shaft of the servo actuator extending from the interior of the housing to its exterior; and
 a component mounting plate disposed between the two halves of the housing, the motor, the clutch, the gear train, and the generating means being mounted on the plate.

8. The servo actuator of claim 7, in which the means for generating a feedback signal is a displacement transducer coupled to the output shaft of the servo actuator, and the means for modifying the actuating signal is a summing junction having inputs to which the actuating signal and the output signal from the displacement transducer are differentially applied.

9. The servo actuator of claim 8, in which the means for generating a feedback signal further comprises a velocity generator coupled to the output shaft of the motor, the output signal from the velocity generator being applied to the summing junction differentially with respect to the actuating signal.

10. The servo actuator of claim 7, in which a slip clutch is coupled directly to the output shaft of the servo actuator to transfer torque below a predetermined value from the motor output shaft to the servo actuator output shaft.

11. The servo actuator of claim 7, in which the output shaft of the clutch is a shaft parallel to the output shaft of the servo actuator and the gear train comprises a plurality of gear supporting shafts rotatably mounted in parallel relationship to the output shaft of the servo actuator, a large gear at the end of each supporting shaft nearest in the path of the gear train to the output shaft of the clutch, a small gear mounted at the end of each supporting shaft nearest in the path of the gear train the output shaft of the servo actuator, a small gear mounted on the output shaft of the clutch, and a large gear mounted on the output shaft of the servo actuator, each large gear engaging the adjacent small gear to form two gear columns that transmit torque from the clutch to the output shaft of the servo actuator in a back and forth path.

12. A servo actuator comprising:
a servo actuator output shaft;
a motor having an output shaft positioned responsive to an electrical actuating signal;
an engageable clutch having an input coupled to the output shaft of the motor and an output shaft parallel to the servo actuator output shaft;
a torque increasing gear train coupling the clutch output shaft to the servo actuator output shaft, the gear train comprising a plurality of gear supporting shafts rotatably mounted in parallel relationship to the servo actuator output shaft, a large gear at the end of each supporting shaft nearest in the path of the gear train to the clutch output shaft, a small gear mounted at the end of each supporting shaft nearest in the path of the gear train to the servo actuator output shaft, a small gear mounted on the clutch output shaft, and a large gear mounted on the servo actuator output shaft, each large gear engaging the adjacent small gear to form two gear columns that transmit torque from the clutch to the servo actuator output shaft in a back and forth path; and
a housing enclosing the motor, clutch, and gear train, the output shaft of the servo actuator extending from the interior of the housing to its exterior.

13. The servo actuator of claim 12, additionally comprising within the housing means for generating an electrical feedback signal representative of the movement of the output shaft of the servo actuator and means for modifying the actuating signal responsive to the feedback signal so the movement of the output shaft is representative of the actuating signal.

* * * * *